Sept. 15, 1953 G. E. PINTER 2,652,504
FLYWHEEL MAGNETO
Filed Aug. 4, 1951
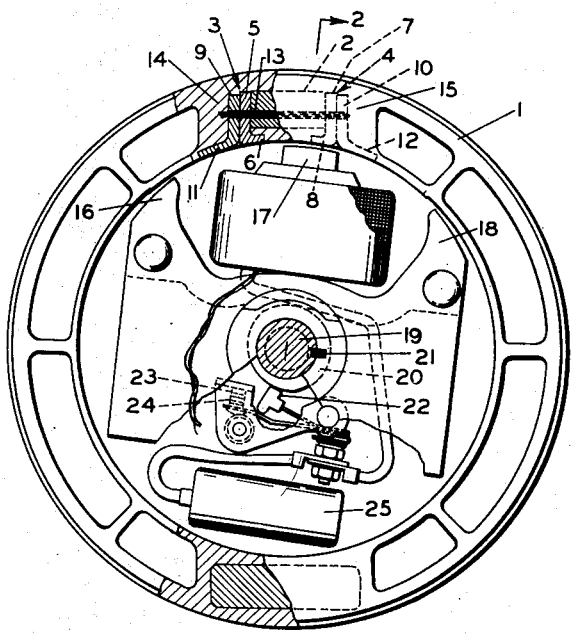
Fig_1_
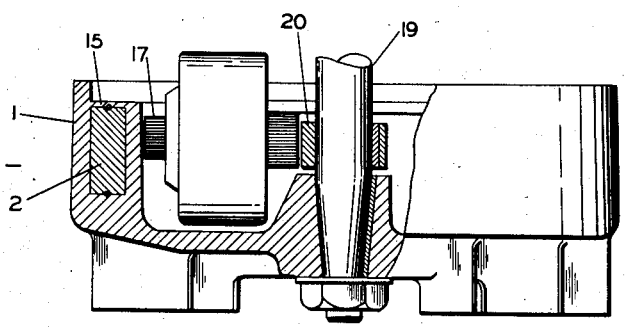
Fig_2_
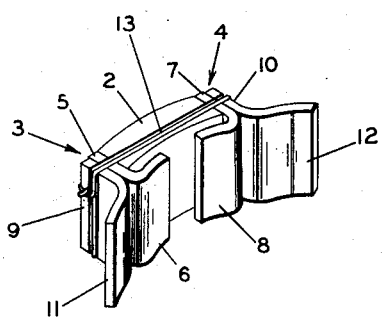
Fig_3_
INVENTOR.
GEORGE E. PINTER
BY
ATTORNEY Patented Sept. 15, 1953

2,652,504

UNITED STATES PATENT OFFICE 2,652,504

FLYWHEEL MAGNETO

George E. Pinter, Cleveland, Ohio, assignor to Jack & Heintz Precision Industries, Inc., Cleveland, Ohio, a corporation of Delaware Application August 4, 1951, Serial No. 240,303

1 Claim. (Cl. 310—42)

This invention relates in general to magnetos and more particularly to flywheel magnetos.

The conventional flywheel magneto employs a long heavy substantially circular permanent magnet, which with its laminated pole shoes is carried by the rotating flywheel, and a stationary core structure. Such long permanent magnets are heavy and expensive and occupy a large space in the magneto.

One of the primary objects of the invention is to provide in a flywheel magneto an improved field structure which will be compact, of light weight and inexpensive in material, construction and assembly.

Another object is to provide in a flywheel magnet a magnetic field structure including a short segment permanent magnet of high coercive force and a novel construction of pole shoes and retaining means therefor and for the permanent magnet.

With the foregoing and other objects in view, the invention resides in the combination of parts and in the details of construction hereinafter set forth in the following specification and appended claim, certain embodiments thereof being illustrated in the accompanying drawings, in which:

Figure 1 is a view in cross section of a flywheel magneto embodying the present invention;

Figure 2 is a view in section taken along line 2—2 of Figure 1; and

Figure 3 is a detail view in perspective of the permanent magnet and the tying wire for securing the permanent magnet and the two pole pieces together.

Referring more particularly to the drawings, the flywheel magneto includes a field structure carried to rotate with the flywheel 1 and a stationary core structure. The field structure includes a short bar permanent magnet 2 of small dimensions and of high coercive force.

The construction and assembly of the permanent magnet 2 and its opposed pole shoes is unique and shown in Figures 1 and 3. One such pole shoe is indicated generally at 3 and the opposed pole shoe is generally indicated at 4. Pole shoe 3 includes an unlaminated narrow strip of metal with a radially inwardly extending leg 5 a circumferentially extending leg 6. Pole shoe 4 includes a similar unlaminated narrow strip of metal with a radially inwardly extending leg 7 and a leg 8 extending circumferentially toward, but spaced from leg 6. In addition, as shown in Figure 3, pole shoes 3 and 4 also include unlaminated outer strips of metal including legs 9 and 10 arranged parallel to the outer faces of legs 5 and 7 and also legs 11 and 12 extending circumferentially in opposite directions. The permanent magnet 2 is seated within the opposed inner faces of legs 5 and 7 and legs 6 and 8. With this assembly in this position, as shown in Figure 3, a strong metallic tie wire 13 is wrapped around legs 9 and 10 and tightened and tied. This binds the complete two-part pole shoes and the permanent magnet, as a unit together. This complete unit of Figure 3 is then placed in the appropriate space provided for in the body of the flywheel and bounded by opposed faces 14 and 15 and secured therein by any approved means such as by die casting or moulding.

The core structure may be made up of laminations of magnetic material shown as having three legs 16, 17 and 18 united at their inner ends and extending radially outwardly with their outer ends angularly spaced and curved to cooperate successively with the polar faces of each of the pole shoes 3 and 4.

With the flywheel 1 rotating clockwise, when the leading pole shoe 4 overlaps leg 17, pole shoe 3 overlaps leg 16 and flux from magnet 2 flows from shoe 3 down leg 16 and up leg 17 to shoe 4. Then when shoe 4 overlaps leg 18 and shoe 3 overlaps leg 17, flux from magnet 2 will flow from shoe 3 down leg 17 and up leg 18 to shoe 4. The magnet 2 is bridged across the ends of the core leg 17, first through one and then through the other of the outer legs 16 and 18 of the core structure.

The electric circuits of the magnets may be of conventional form to include in cooperation with the magneto shaft 19 a cam 20 secured thereto by a key 21, a cam follower 22, breaker points 23 and 24 and a bridging condenser 25.

From the foregoing, it will be seen that I have provided a flywheel magneto having a magnetic field structure that has many advantages, including savings in the cost of materials and assembly. The construction is not only cheaper in material and assembly but is more efficient than the conventional. The field is compact and light in weight. It is small and installable in the minimum amount of space. The pole shoes and short permanent magnet, of high coercive force, are tied together as a compact unit and installable as a unit in the flywheel. The pole shoe construction, moreover, eliminates the conventional costly laminated pole shoe construction.

I claim:

In a flywheel magneto, a flywheel having a recess in the inner face thereof, a core structure, a self-contained field structure unit comprising a pair of circumferentially spaced pole shoes and a relatively short bar magnet of high coercive force therebetween, said magnet being of greater length circumferentially than the space between said pole shoes, each of the pole shoes comprising a pair of solid substantially L-shaped strips of metal extending axially of the flywheel to the full width of the magnet with corresponding legs stacked against a pole face of said magnet and the other legs extending in opposite directions circumferentially of the flywheel, said field structure being formed into a self-contained unit that is adapted to be inserted and installed as a unit in said flywheel and means for effecting relative rotation between the core and field structures.

GEORGE E. PINTER.

References Cited in the file of this patent

UNITED STATES PATENTS

| Number | Name | Date |
|---|---|---|
| 2,101,392 | Harmon | Dec. 7, 1937 |
| 2,101,591 | Muse | Dec. 7, 1937 |
| 2,447,727 | Alstrom | Aug. 24, 1948 |
| 2,458,336 | Brownlee | Jan. 4, 1949 |
| 2,482,476 | Girard | Sept. 20, 1949 |
| 2,493,102 | Brainard | Jan. 3, 1950 |

FOREIGN PATENTS

| Number | Country | Date |
|---|---|---|
| 457,602 | Great Britain | Dec. 1, 1936 |